(12) United States Patent
Grünwald et al.

(10) Patent No.: US 9,797,631 B2
(45) Date of Patent: Oct. 24, 2017

(54) TEMPERATURE-CONTROL DEVICE AND METHOD FOR THE TEMPERATURE CONTROL OF AN ENERGY STORE

(75) Inventors: Jürgen Grünwald, Ludwigsburg (DE); Manuel Wehowski, Stuttgart (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 150 days.

(21) Appl. No.: 14/000,945

(22) PCT Filed: Feb. 24, 2012

(86) PCT No.: PCT/EP2012/053205
§ 371 (c)(1),
(2), (4) Date: Aug. 22, 2013

(87) PCT Pub. No.: WO2012/113930
PCT Pub. Date: Aug. 30, 2012

(65) Prior Publication Data
US 2013/0323543 A1     Dec. 5, 2013

(30) Foreign Application Priority Data
Feb. 25, 2011   (DE) .................. 10 2011 004 721

(51) Int. Cl.
*H01M 10/50*     (2006.01)
*F25B 21/02*     (2006.01)
(Continued)

(52) U.S. Cl.
CPC .............. *F25B 21/02* (2013.01); *F25B 21/04* (2013.01); *H01M 10/486* (2013.01);
(Continued)

(58) Field of Classification Search
None
See application file for complete search history.

(56) References Cited

U.S. PATENT DOCUMENTS 4,314,008 A     2/1982  Blake
6,213,198 B1 *  4/2001  Shikata .............. B60H 1/00478
                                                    165/202
(Continued)

FOREIGN PATENT DOCUMENTS

DE    11 2006 000 970 T5    3/2008
DE    10 2008 034 887 A1    6/2009
(Continued)

OTHER PUBLICATIONS

International Search Report, PCT/EP2012/053205, Jun. 11, 2012, 3 pgs.
(Continued)

*Primary Examiner* — Patrick Ryan
*Assistant Examiner* — Victoria Lynch
(74) *Attorney, Agent, or Firm* — Paul D. Strain, Esq.; Strain & Strain PLLC

(57) ABSTRACT

The invention relates to a temperature-control device for the temperature control of an energy source, wherein the temperature-control device comprises a temperature-control unit, which has at least one Peltier element which is arranged between an accommodation area for the energy source and a fluid area in a thermally effective manner. Furthermore, the temperature-control device comprises a control unit for supplying voltage to the Peltier element, wherein the control unit is designed to supply a voltage to the Peltier element, which causes the Peltier element to transfer heat from the hotter part of the accommodation area or fluid area to the colder part of the accommodation area or fluid area.

14 Claims, 6 Drawing Sheets

(51) Int. Cl.
*H01M 10/48* (2006.01)
*F25B 21/04* (2006.01)
*H01M 10/625* (2014.01)
*H01M 10/615* (2014.01)
*H01M 10/6556* (2014.01)
*H01M 10/6568* (2014.01)
*H01M 10/6572* (2014.01)
*H01M 10/613* (2014.01)
*H01M 10/637* (2014.01)

(52) U.S. Cl.
CPC ....... *H01M 10/613* (2015.04); *H01M 10/615* (2015.04); *H01M 10/625* (2015.04); *H01M 10/6556* (2015.04); *H01M 10/6568* (2015.04); *H01M 10/6572* (2015.04); *F25B 2321/0212* (2013.01); *H01M 10/637* (2015.04)

(56) References Cited

U.S. PATENT DOCUMENTS

| | | | | |
|---|---|---|---|---|
| 6,557,354 | B1* | 5/2003 | Chu | ........................ H01L 35/30 62/259.2 |
| 2008/0295535 | A1* | 12/2008 | Robinet | ............. B60H 1/00278 62/259.2 |
| 2010/0062321 | A1 | 3/2010 | Nakamura | |
| 2010/0153066 | A1* | 6/2010 | Federer | ..................... B01L 7/52 702/181 |
| 2010/0243346 | A1 | 9/2010 | Anderson et al. | |
| 2010/0291414 | A1* | 11/2010 | Bell | .................... H01M 2/1077 429/7 |
| 2011/0244300 | A1* | 10/2011 | Closek | ................. H01M 2/1077 429/120 |
| 2013/0104953 | A1* | 5/2013 | Poliquin | ................. H01L 35/30 136/224 |

FOREIGN PATENT DOCUMENTS

| | | | |
|---|---|---|---|
| DE | 10 2010 011 668 A1 | 12/2010 | |
| DE | 10 2009 041 137 A1 | 3/2011 | |
| EP | 2 133 952 A1 | 12/2009 | |
| IT | EP 1981095 A2 * | 10/2008 | ............. H01L 35/32 |
| WO | WO 2010/071463 A1 | 6/2010 | |
| WO | WO 2010/135371 A2 | 11/2010 | |

OTHER PUBLICATIONS

German Search Report, DE 10 2011 004 721.2, Oct. 25, 2011, 8 pgs.

* cited by examiner

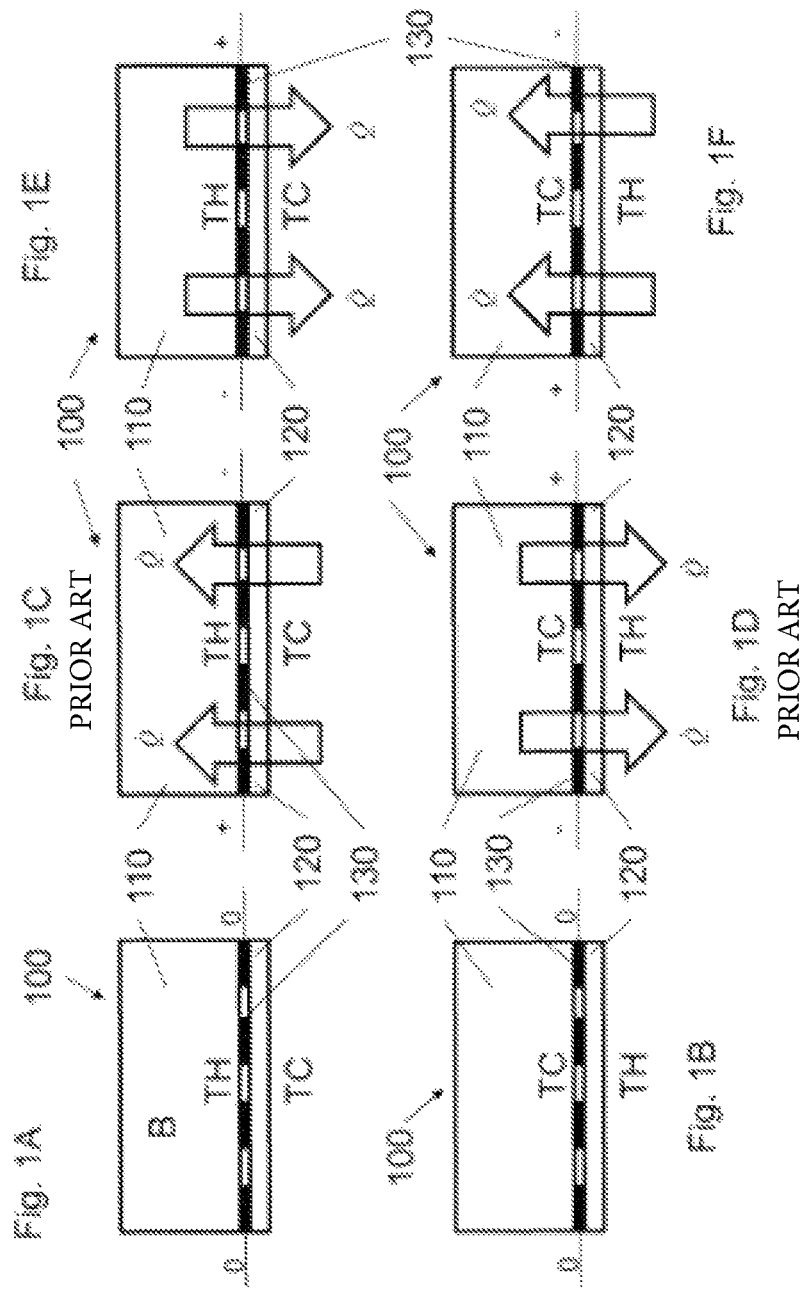

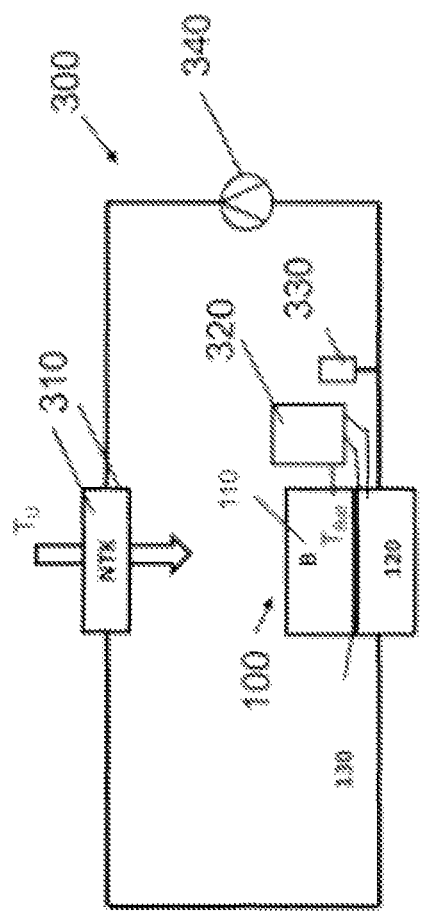

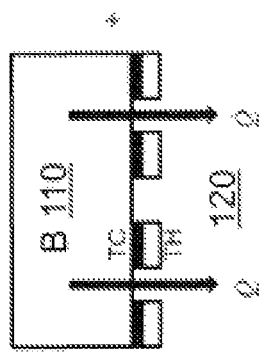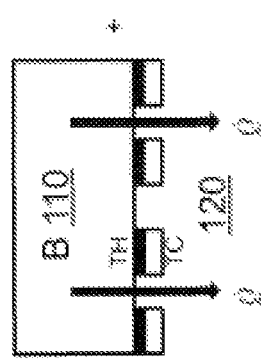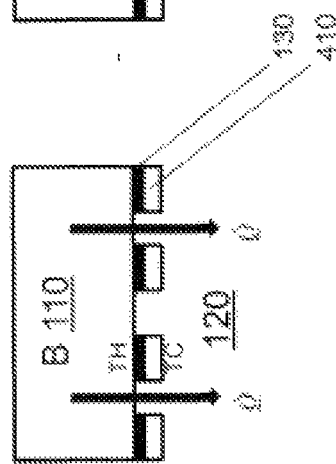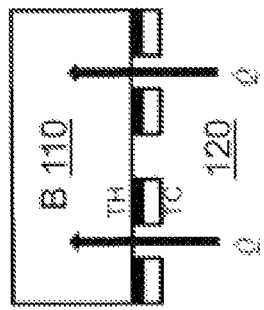

TEMPERATURE-CONTROL DEVICE AND METHOD FOR THE TEMPERATURE CONTROL OF AN ENERGY STORE

CROSS-REFERENCE TO RELATED PATENT APPLICATIONS

This application is a National Stage of International Application No. PCT/EP2012/053205, filed Feb. 24, 2012, which is based upon and claims the benefit of priority from prior German Patent Application No. 10 2011 004 721.2, filed Feb. 25, 2011, the entire contents of all of which are incorporated herein by reference in their entirety.

The present invention relates to a temperature-control device for the temperature control of an energy store according to claim 1 and to a method for the temperature control of an energy store according to claim 10.

When modern high-power batteries are used which are composed of a number of individual cells (for example accumulators or secondary batteries), such as, for example, in electric vehicles or hybrid vehicles, it is necessary to ensure that the temperature of the battery is in a certain interval during operation in order to safeguard the efficiency, functional capability and safety of the device.

On the one hand, the efficiency of the battery cells drops to a very great extent when a suitable operating temperature is undershot, and the cells produce a high power loss. On the other hand, above a suitable operating range processes occur within the cells which lead to irreversible damage.

For these reasons, it is necessary to perform battery temperature control (cooling or heating). For the purpose of battery temperature control, a temperature-control medium (for example refrigerant, coolant or air) which is in thermal contact with the battery via a connection is frequently used. A further possible way of performing battery temperature control is to use thermoelectric elements.

Since the waste heat of the battery, like the ambient conditions, can vary greatly, the temperature control has to be adapted to changing conditions. In this context, the temperature control should be made as energy-efficient as possible. In some combinations of the operating state of the battery and ambient conditions passive temperature control is sufficient. If, for example, the battery reaches its upper temperature limit owing to strong loading, but the environment is cold enough, the battery should be protected against overheating by thermal conduction and convection. In this context, a further heat-transfer fluid can also be intermediately connected between the surroundings and the battery (for example coolant, refrigerant or air). Furthermore, under certain circumstances it may be necessary for there to be as far as possible no thermal contact between the battery and surroundings, not even via an intermediately connected heat-transfer fluid. For example, at low external temperatures the battery should be pre-conditioned to operating temperature since at the moment it generates only a small amount of intrinsic heat owing to low power consumption and power take-up.

Furthermore, a cold battery can be heated with the aid of relatively warm ambient air or a relatively warm transfer fluid if, for example, a cold vehicle is driving into a relatively warm environment. It would therefore be appropriate, depending on the requirements, to "connect" a large or small heat transition between the battery and the surroundings.

Document U.S. Pat. No. 4,314,008 discloses a thermoelectric temperature-control system for batteries, in which the accumulators are located in a housing which is cooled or heated by an external layer of Peltier elements. In the event of cooling, the waste heat is discharged to the surrounding air via cooling fins on the other side of the Peltier elements, and in the event of heating the taken-up heat is acquired from said surrounding air via said cooling fins.

US 2010/0062321 A1 discloses switchable insulation by means of a drive mechanism which makes available two modes. In addition to a mechanical mechanism, the two modes can also be set by an expanding medium (for example vaporization, bimetal).

DE 10 2008 034 887 A1 discloses an air cooler which can be used, according to requirements, for cooling a battery. Switchable insulation is implemented by means of bi-metal strips.

In principle, fluid-cooled systems require the use of additional components. These include, inter alia, a unit for delivering the temperature-control medium (for example a compressor, a pump or a blower), heat exchangers, valves, fluid lines etc. In the case of cooling with a refrigerant or coolant, the temperature-control medium has to be additionally made available.

The following disadvantages occur during the implementation of switchable insulation means according to the prior art. On the one hand, mechanical switches are based on moving parts which increase the system complexity and result in increased susceptibility to wear and malfunction. On the other hand, the implementation of switchable insulation by means of one or more fluids increases the system complexity of the system, and entails additional costs and an increased requirement for components and installation space.

The object of the present invention is to provide an improved temperature-control device and an improved temperature-control method.

This object is achieved by means of a temperature-control device and a temperature-control method according to the main claims.

The present invention provides a device for the temperature control of an energy source, wherein the device comprises the following features:

a temperature-control unit which has at least one Peltier element which is arranged in a thermally active fashion between an accommodation region for the energy source and a fluid region;

a control unit for supplying voltage to the Peltier element, wherein the control unit is designed to feed to the Peltier element a voltage which causes the Peltier element to transfer heat from the hotter of the accommodation region or the fluid region to the colder of the accommodation region or fluid region.

In addition, the present invention provides a method for controlling the temperature of an energy source using a temperature-control device which has at least one Peltier element which is arranged in a thermally active fashion between an accommodation region for the energy source and a fluid region, wherein the temperature-control device also has a control unit for supplying voltage to the Peltier element, wherein the control unit is designed to feed to the Peltier element a voltage which causes the Peltier element to transfer heat from the hotter of the accommodation region or fluid region to the colder of the accommodation region or fluid region, and wherein the method comprises the following steps:

reading in temperature values and/or temperature differences which represent a temperature in the accommodation region and in the fluid region and/or a temperature difference between the accommodation region and the fluid region; and applying to the Peltier element a voltage which causes the Peltier element to transfer heat from the hotter of the accommodation region or fluid region to the colder of the accommodation region or fluid region.

The present invention is based on the realization that very efficient control of the thermal insulation between an accommodation region for the energy source and a fluid region can be achieved by virtue of the fact that a Peltier element, which is supplied with voltage by means of a control unit, is arranged between the two aforementioned regions, with the result that heat is transferred from a relatively warm region into a relatively cold region through the Peltier element. This transfer of heat corresponds to the known thermal flux when a "heat pump" in the form of a Peltier element, to which voltage is applied in this way, is not used. In contrast with the customary use of the Peltier element as a heating element, specifically for "pumping" heat from a relatively cold region into a relatively warm region, or as a cooling element, specifically for "pumping" heat from a relatively cold region into a relatively hot region, in the approach presented here a thermal resistance of this Peltier element is reduced by actively applying voltage to the Peltier element, with the result that a natural thermal flux from the relatively warm region into the relatively cold region is assisted. In this way, the otherwise strong thermally insulating effect of a Peltier element can be controlled easily by applying a voltage to the Peltier element. In this context, use is made of the fact that after a voltage with a positive or negative sign has been applied to the Peltier element, said element permits heat to be transferred in a first or second direction. In this way, it is advantageously possible to avoid a situation in which, in order to bring about controllable insulation between two regions which are to be insulated thermally, it is always necessary to use mechanical components which have the disadvantages described above.

In addition, it is favorable if the control unit is designed to feed to the Peltier element a voltage which causes the Peltier element to transfer heat from the colder of the accommodation region or fluid region to the hotter of the accommodation region or fluid region. Such an embodiment of the present invention provides the advantage that not only is a controllable insulation effect of the Peltier element made possible by applying the voltage, but also the Peltier element can also be used actively for cooling or heating. This extends the range of use of the invention proposed here.

The transition between the controllable insulation effect specified above and the active cooling, likewise mentioned above, can be fluid as far as the electrical power is concerned. Also, in the variant mentioned first, a net thermal flux from the cold side to the warm side of the thermoelectric functional material (for example bismuth telluride) can be present inside the energized Peltier element, but there can also be a net thermal flux present from the warm side to the cold side of the functional material (Thomson effect). What actually occurs can depend on the thermal resistance values of the adjoining regions.

According to another embodiment of the present invention, the control unit can be designed not to feed any voltage or to feed a voltage of 0 volt to the Peltier element during operation of the temperature-control device. Such an embodiment of the present invention provides the advantage that an insulation effect of the Peltier element can also be set selectively, for example if a very low temperature is present in the fluid region, whereas an energy source which is positioned in the accommodation region requires a certain minimum temperature in order to supply energy. If no voltage is then fed to the Peltier element, it acts as a thermal insulator and therefore ensures that as little heat as possible can flow out of the accommodation region.

It is particularly advantageous if the temperature-control unit has at least one fluid duct for conducting a temperature-control medium, wherein the fluid duct is arranged in the fluid region. Such an embodiment of the present invention provides the advantage of very efficient cooling or heating since a corresponding temperature-control medium can be fed in or discharged through the fluid duct, with the result that selective and very good control of feeding in or conduction away of heat becomes possible.

According to one advantageous embodiment of the present invention, the temperature-control unit also has at least one further fluid duct which is thermally coupled to the accommodation region, wherein there is no Peltier element arranged between the further fluid duct and the accommodation region. Such an embodiment of the present invention provides the advantage that a large temperature-control area is available and cost-intensive, over-dimensioned full equipment of the fluid ducts with Peltier elements can be eliminated.

In addition, according to another embodiment of the present invention, the temperature-control unit can have a temperature-control medium circuit with at least the fluid duct and a cooler. Such an embodiment of the present invention provides the advantage that a compact design of the temperature-control device becomes possible through the provision of the specified temperature-control medium circuit, since the possibility of efficiently conducting away heat or feeding heat from the fluid duct to the cooler, also permits regions of the temperature-control device which are arranged at a distance from an external surface of the temperature-control device, in the interior of the temperature-control device, to be efficiently connected to a heat exchange means.

In order to permit even better controllability of the exchange of heat, the fluid duct and/or a further fluid duct can also have in the fluid region at least one valve which is designed to influence or suppress a flow of the temperature-control medium in the fluid duct or in the further fluid duct. Such an embodiment of the present invention provides the advantage that a flow of fluid through the fluid duct or the further fluid duct can then be selectively interrupted or its strength can be controlled in order, as a result, to achieve better regulation of the heat which is fed into the accommodation region or conducted away therefrom.

Such a valve can be configured particularly easily and therefore cost-effectively if the at least one valve is a temperature-controlled bimetal valve.

In order to transfer heat in a way which can be controlled very well, the at least one valve can also be controllable by the control unit, wherein the control unit is designed to open or close the valve as a function of a temperature in the accommodation region and/or in the fluid region. Such an embodiment of the present invention provides the advantage that in addition to supplying the Peltier element with a voltage, the control unit can also regulate very precisely the feeding in of heat into the Peltier element or the conduction away of heat therefrom, and therefore also the feeding of heat into the accommodation region, or the conduction away of heat therefrom, by controlling the switched state of the valve.

According to a further embodiment of the present invention, it is also possible to arrange in the accommodation region an energy source which is thermally coupled to the Peltier element. As a result, highly effective and simple temperature control of this energy source becomes possible.

Advantageous embodiments of the present invention are explained in more detail below with reference to the appended drawings, in which:

FIGS. 1A-F show schematic illustrations of active principles of a Peltier element with different thermal gradients and different energization;

FIG. 3 shows a block circuit diagram of a temperature-control medium circuit with a low temperature cooler and a Peltier element between an accommodation region for an energy source such as a battery and a cooling panel with fluid ducts;

FIG. 4A shows a schematic illustration of a first operating state of the temperature-control device which is based on a cross-sectional view of an examplary embodiment of the present invention;

FIG. 4B shows a schematic illustration of a second operating state of the temperature-control device which is based on a cross-sectional view of an exemplary embodiment of the present invention;

FIG. 4C shows a schematic illustration of a third operating state of the temperature-control device which is based on a cross-sectional view of an exemplary embodiment of the present invention;

FIG. 4D shows a schematic illustration of a fourth operating state of the temperature-control device which is based on a cross-sectional view of an exemplary embodiment of the present invention;

In the following description of the preferred exemplary embodiments of the present invention, identical or similar reference symbols are used for the similarly acting elements illustrated in the various drawings, with a repeated description of these elements being avoided.

Figure 2A:
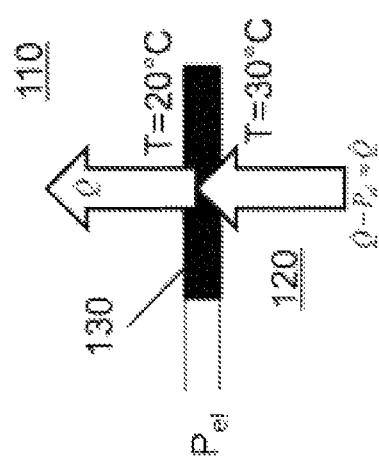
FIG. 2A shows a schematic illustration of transfer of heat from a hotter region to a colder region.

As described in the prior art, Peltier elements are arranged thermally between the battery and a heat-transfer fluid (air, coolant, etc.). Instead of the otherwise customary operating mode of pumping heat from the cold side to the warm side, the present invention discloses an approach of actively pumping heat from the warm side to the cold side by the direction of the flow of current being correspondingly reversed compared to what is customary in the customary cooling pump operation or heating pump operation. FIG. 1 shows different partial figures which illustrate six different cases of temperature gradients. In this context, a receptacle space or accomodation region 110 and a fluid space or fluid region 120, which are disconnected by at least one Peltier element 130, are shown, wherein the Peltier element 130 is coupled thermally both to the accomodation region 110 and to the fluid region 120. In the accomodation region 110 a battery is arranged as an example of an energy source. In the following illustrations, the hotter of the accomodation region or fluid region is denoted by TH, and the colder of the accomodation region or fluid region is denoted by TC. In the illustration from FIG. 1A, a scenario is represented in which accomodation region 110 is hotter than the fluid region 120, and in which no voltage is applied to the Peltier element, which is symbolized by the illustration of the zero at the two ends on the left and right of the Peltier element 130. The Peltier element 130 is therefore used as a thermal insulation element, since a non-energized Peltier element usually has a high thermal resistance.

FIG. 1B represents a scenario which is analogous to the scenario from FIG. 1A, with the accomodation region 110 now being colder than the fluid region 120. Likewise, in the scenario according to FIG. 1B no voltage is applied to the Peltier element 130. In this scenario, the Peltier element 130 also acts again as a thermal insulator.

In the illustration in FIG. 1C, the accomodation region 110 is hotter than the fluid region 120, with a voltage being applied to the Peltier element in such a way that a transfer Q of heat takes place from the colder side (i.e. the fluid region 120) into the hotter region (i.e. the accomodation region 110 for the energy source); this means that heat is pumped from the colder side to the hotter side, with the result that the Peltier element acts as a heater. In this case, active temperature control is carried out by means of the Peltier element.

In the illustration in FIG. 1D, the accomodation region 110 is colder than the fluid region 120, and a voltage is applied to the Peltier element 130 in such a way that a transfer Q of heat takes place from the accomodation region 110 into the fluid region 120 via the Peltier element 130. In this case, the Peltier element 130 also acts in an actively temperature-controlling fashion, here as a cooling means for an element such as the energy source in the accomodation region 110.

In FIGS. 1C and 1D, the Peltier element 130 is supplied with opposing voltages which bring about the desired transfer Q of heat into the accomodation region 110 or out of the accomodation region 110. The corresponding polarity of the voltage is illustrated by way of example at the two lateral ends of the Peltier element 130 from FIGS. 1C and 1D.

The cases illustrated in FIGS. 1C to 1D correspond to the prior art. The illustrations from FIGS. 1E and 1F correspond to the basic idea on which the present invention is based. FIG. 1E illustrates a scenario in which the accomodation region 110 is hotter than the fluid region 120. However, here one polarity of the voltage which is applied to the Peltier element 130 is applied in the way illustrated in FIG. 1D. Here, heat Q is conveyed from the hotter accomodation region 110 in the direction of the colder fluid region 120 via the Peltier element, wherein this transfer of heat would also take place in a natural way by virtue of the temperature gradient. The voltage applied to the Peltier element 130 therefore acts in such a way that it promotes a natural flow of heat from the hotter accomodation region 110 into the colder fluid region 120, and therefore reduces the insulation effect of the Peltier element 130.

FIG. 1F illustrates a scenario in which the fluid region 120 is hotter than the accomodation region 110, wherein a voltage corresponding to the illustration from FIG. 1C is applied to the Peltier element 130, i.e. a transfer Q of heat from the hotter fluid region 120 into the colder accommodation region 110 is promoted by the Peltier element 130. Here, the polarity of the voltage at the Peltier element 130 also reduces the insulation effect of the Peltier element 130, with the result that the natural transfer of heat is promoted.

The illustration of the electrical polarity from FIGS. 1C to 1F shows how the polarity of the solution presented here is configured relative to the polarity of the active cooling pump operating mode or heating pump operating mode which is used in the prior art. The electrical polarity defines the direction of the net flow of heat which is generated on the basis of the Peltier effect. The variants (illustrated in FIGS. 1E and 1F) of the solution presented here differ from the other four variants described in conjunction with FIGS. 1A to 1D in that this net flow of heat generated by the Peltier effect has the same sign as the natural flow of heat and both flows of heat together bring about an overall higher, real total flow of heat.

Figure 2B:
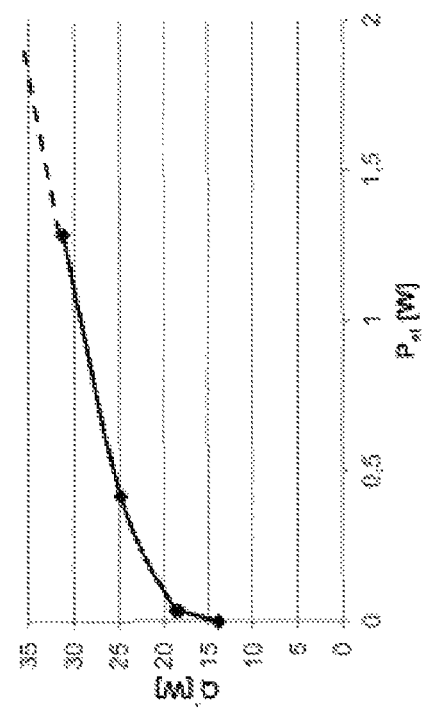
FIG. 2B shows a diagram of power which is to be consumed electrically with respect to the heat flow conducted through the Peltier element.

FIG. 2A represents a schematic illustration of a Peltier element 130 which, by way of example, is located between an accomodation region 110 with a temperature of 20° C. and a fluid region 120 with a temperature of 30° C. When a low voltage or a low power level of, for example, 1 W is applied to the Peltier element 130, a significant increase can be achieved in the transfer of heat by the Peltier element 130. This can be seen well in a diagram in FIG. 2B in which measured values of a transfer of heat are illustrated for a commercially available Peltier element with respect to a fed-in electrical power to this Peltier element. Without a flow of current (i.e. without consumption of electrical power), only a small natural flow of heat of approximately 13 W results owing to the relatively poor thermal conductivity of the thermoelectric material (i.e. of the Peltier element 130). This state corresponds accordingly to a more thermally insulated system. When a very low power of 1 W, which is virtually negligible in view of the heat transferred, is fed in, the transferred heat rises to above twice the value of approximately 29 W. This trend is continuing to still higher electrical power levels, with the result that tripling of the transfer of heat with negligible use of electrical power could be expected, subject to future progress with respect to commercially available materials which could further improve this value. This state then corresponds to a system with good thermal contact between the battery and the surroundings or between the battery and a via an intermediately connected heat-transfer fluid to the surroundings. This allows switchable insulation, or in other words a switchable heat bridge, to be implemented without moving parts.

FIG. 3 shows a block circuit diagram of a temperature-control medium circuit 300 using a temperature-control device according to an exemplary embodiment of the present invention. The temperature-control medium circuit 300, in which a temperature-control medium can circulate, comprises a low-temperature cooler 310 which uses, for example, ambient air at the temperature $T_a$ to carry out cooling of a temperature-control medium, such as for example a coolant or refrigerant or else air, which circulates in the temperature-control medium circuit. Furthermore, the temperature-control medium circuit comprises the temperature-control device 100 according to an exemplary embodiment of the present invention. This temperature-control device 100 comprises the accomodation region 110 in which, according to the exemplary embodiment illustrated in FIG. 3, a battery or some other energy source is arranged, wherein this battery or the energy source is at the temperature $T_{bat}$. A Peltier element 130, which divides the accommodation region from the fluid region 120 in which a cooling panel is arranged, is thermally coupled to this accommodation region 110. As is also described in more detail below, a multiplicity of fluid ducts in the form of ducts in which the temperature-control medium, for example the coolant or refrigerant (or else air), can flow are also provided in the cooling panel. Furthermore, the temperature-control medium circuit comprises a control unit of the temperature-control device 320, which control unit is designed to measure a temperature in the accommodation region 110 and a further temperature in the fluid region 120 or at least read in such a measured temperature. In response to the read-in temperature values for the accommodation region 110 and a fluid region 120, a voltage, in particular the polarity of the voltages, applied to the Peltier element 130 is determined in the control unit 320, in order to assist in carrying out the transfer of heat already described above. This will be explained in yet more detail below with reference to FIGS. 4A to 4D.

In addition, the temperature-control medium circuit 300 comprises a temperature-control medium reservoir 330 and a compressor or a pump 340 for conveying the temperature-control medium back to the low-temperature cooler 310.

FIG. 3 therefore shows a block circuit diagram of a first exemplary embodiment of the present invention in which a fluid-cooled battery cooling panel—in this example coolant-cooled via a low-temperature cooler and arranged in the fluid space 120—is embodied with Peltier elements or Peltier element layers 130. In this case, the Peltier elements are arranged between the battery B (in the accommodation region 110) and the fluid-conducting ducts 410 (in the fluid region 120), as is apparent from the individual partial figures of FIG. 4. These partial figures of FIG. 4 represent here a cross-sectional view through a temperature-control device 100 according to the illustration from FIG. 3, wherein in each case four fluid ducts (i.e. a plurality thereof), which are thermally coupled to the battery in the accommodation region 110 via one or more Peltier elements 130, are provided in the fluid region 120 of the partial figures from FIG. 4. The energization of the Peltier elements 130 and the operation of the fluid cooling through the operation of the pump and/or the low-temperature cooler depend on various operating conditions. In particular, the ambient temperature (which prevails in the fluid region 120 of the temperature-control device via the temperature-control medium) and the cell temperature of the battery (i.e. the temperature in the accommodation region 110) are decisive here.

The cases a) to c) below describe states in which the battery has reached its permissible maximum temperature and should be cooled in order to avoid irreversible damage.

Case a) (illustrated in FIG. 4A):

The battery B has reached its permissible maximum temperature $T_{bat} \approx T_{bat,perm}$ and the ambient air is very cold, i.e. $T_a$ is very much lower than $T_{bat}$. In this case, it is sufficient to cool the battery via the temperature-control medium with a low-temperature cooler switched or a pump 340 switched on, in order to ensure sufficiently high conduction Q away of heat in order to protect the battery from destruction. The Peltier elements 130 therefore do not need to be energized.

Case b) (illustrated in FIG. 4B):

The battery B has reached its permissible maximum temperature $T_{bat} \approx T_{bat,perm}$ and the ambient air $T_a$ is colder, taking into account a certain temperature difference $\Delta T_{diff}$, than the battery temperature, so that the following applies: $T_a + \Delta T_{diff} < T_{bat}$. In this case, the cooling of the battery via the temperature-control medium, as described in case a), is not sufficient, so that additional "passive cooling" is performed by energizing the Peltier elements in order to ensure sufficiently high conduction Q away of heat in order to protect the battery from destruction. The low-temperature cooler 310 or the pump 340 is switched on in this operating state.

Case c) (illustrated in FIG. 4C):

The battery B has reached its permissible maximum temperature $T_{bat} \approx T_{bat,perm}$ and the ambient air $T_a$ is hotter, taking into account a certain temperature difference $\Delta T_{diff}$, than the battery temperature, so that the following applies: $T_a + \Delta T_{diff} > T_{bat}$. In this case, merely cooling the battery via the temperature-control medium is not sufficient, and so additional "active cooling" is performed by energizing the Peltier elements in order to ensure sufficiently high conduction Q away of heat in order to protect the battery from destruction. In this case, a natural transfer of heat in the direction of the colder region through the Peltier element 130, as in the case of passive cooling, is therefore not implemented; instead transfer of heat is brought about from the colder region to the hotter region counter to the natural transfer of heat by energization of the Peltier element 130. The low-temperature cooler 310 or the pump is likewise switched on in this operating state.

Case d) (illustrated in FIG. 4D):

The case d) describes the state in which the surrounds are cold and the battery is so cold that it should be heated. In the simplest case, in the event of heating the temperature-control medium is not circulated (i.e. the low-temperature cooler 310 and the pump 340 are switched off) and "active heating" takes place through energization of the Peltier elements. In this case, as a result of the energization of the Peltier elements 130, a transfer Q of heat is therefore initiated from the colder region to the hotter of the two regions. In order to utilize the heat pumping effect, the temperature-control medium can also be circulated in the starting phase of the heating, as long as the cold side of the Peltier elements is colder than the temperature of the temperature-control medium. Subsequently, the circulation of the fluid is interrupted, wherein the "active heating" is carried on by energizing the Peltier elements.

Figure 5:
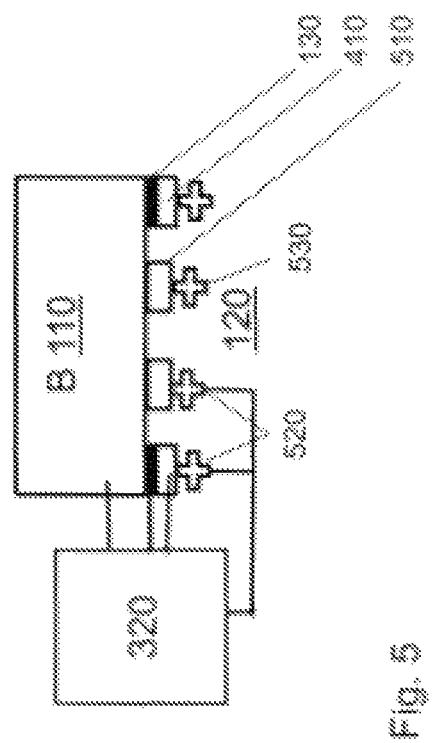
FIG. 5 shows a schematic cross-sectional view through a second exemplary embodiment of the present invention.

A second exemplary embodiment is based on the first exemplary embodiment. In addition to fluid ducts 410 which are equipped with Peltier elements or Peltier elements layers, there are additionally also fluid ducts 510 without Peltier elements, as illustrated in FIG. 5. The advantage with this embodiment is that a large temperature-control area is available, and cost-intensive, over-dimensioned full equipment of the fluid ducts with Peltier elements is eliminated. Furthermore, the Peltier layer constitutes a further thermal resistance to the temperature-control medium, which reduces the natural flow of heat.

In the simplest case, when there is a flow through the fluid ducts, the flow always passes through all the ducts. Alternatively, the flow through the fluid ducts with Peltier elements 410 and without Peltier elements 510 can be controlled by switching a valve 520 (for example per fluid duct 410 or 510). In this context, there can preferably be a continuous flow through the fluid ducts 410 with Peltier elements, while the ducts 510 without Peltier elements are open or closed depending on the valve adjustment. For this purpose, a solenoid valve 520 or a temperature-controlled bimetal valve 530 is appropriate as the valve. In the cooling mode, provided that the temperature-control medium is colder than the battery, a flow through all the ducts is advantageous. If the temperature-control medium (in the cooling mode) is hotter than the battery, the flow should only pass through the ducts with Peltier elements. In the case of heating, there should only be a flow through the ducts without Peltier elements if the temperature-control medium is hotter than the battery.

The concept which is presented for cooling high-power batteries permits energy-efficient temperature control of high-power batteries by means of thermoelectric elements. The advantage over conventional, switchable insulating means is that no moving parts are required. If there is direct use of the ambient air without an intermediately connected transfer medium it is additionally possible to dispense with additional fluid circuits with additional components which are intensive in terms of cost and installation space. As a result, the invention which is presented here permits switchable insulation to be implemented with thermoelectrics, in which the concept which is described in the invention permits the temperature control of high-power batteries to be performed according to requirements, wherein switchable insulation or variable inputting of heat between the surroundings and the battery is implemented by thermoelectric elements.

Figure 6:
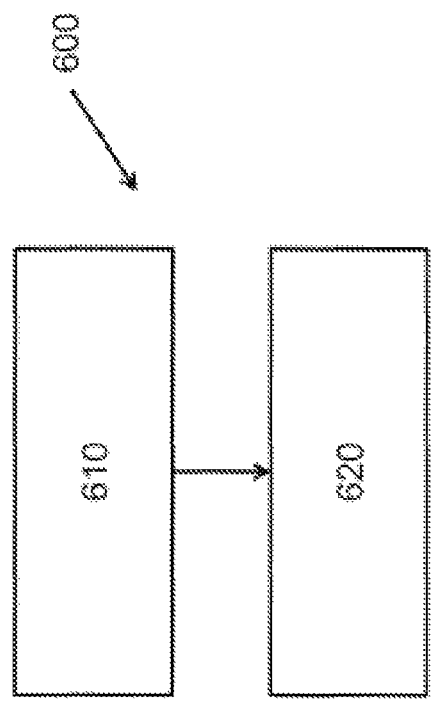
FIG. 6 shows a flow chart of an exemplary embodiment of the present invention as a method.

FIG. 6 illustrates a flow chart of an exemplary embodiment of the present invention as a method for performing temperature control of an energy source using a temperature-control device which comprises a temperature-control device which has at least one Peltier element which is arranged in a thermally active fashion between an accommodation region for the energy source and a fluid region. The temperature-control device also comprises a control unit for supplying voltage to the Peltier element, wherein the control unit is designed to feed to the Peltier element a voltage which causes the Peltier element to transfer heat from the hotter of the accommodation region or fluid region to the colder of the accommodation region or fluid region. The method 600 comprises a step of reading in 610 temperature values or temperature differences which represent a temperature in the accommodation region and in the fluid region and/or a temperature difference between the two regions. In addition, the method comprises a step of supplying 620 the Peltier element with a voltage which causes the Peltier element to transfer heat from the hotter of the accommodation region or fluid region to the colder of the accommodation region or fluid region.

The described exemplary embodiments are selected only by way of example and can be combined with one another (also in terms of components).

The invention claimed is:

1. A temperature-control device for the temperature control of an energy source, comprising:
   a temperature-control unit which has at least one Peltier element which is arranged in a thermally active fashion between an accommodation region for the energy source and a fluid region; and
   a control unit for supplying voltage to the Peltier element, wherein,
   the control unit is configured to operate in three modes, wherein:
   (a) in the first mode, the control unit feeds to the Peltier element a voltage that causes the Peltier element to transfer heat from the hotter of the accommodation region or the fluid region to the colder of the accommodation region or fluid region;
   (b) in the second mode, the control unit feeds to the Peltier element a voltage that causes the Peltier element to transfer heat from the colder of the accommodation region or fluid region to the hotter of the accommodation region or fluid region;
   (c) in the third mode, the control unit does not feed a voltage to the Peltier element during operation of the temperature-control device,
   wherein the amount of power measured in watts delivered to the Peltier element to transfer heat in the first mode or in the second mode is not greater than 10% of the amount of heat transferred by the Peltier element measured in watts,
   wherein a rate of heat transfer in the first mode or in the second mode more than doubles when 1 watt of power is delivered to the Peltier element as compared to when 0 watts of power are delivered to the Peltier element.

2. The temperature-control device as claimed in claim 1, wherein the temperature-control unit has at least one fluid duct for conducting a temperature-control medium, wherein the fluid duct is arranged in the fluid region.

3. The temperature-control device as claimed in claim 1, wherein the temperature-control unit also has at least one further fluid duct in the fluid region which is thermally coupled to the accommodation region, wherein there is no Peltier element arranged between the further fluid duct and the accommodation region.

4. The temperature-control device as claimed in claim 2, wherein the temperature-control unit has a temperature-control medium circuit with at least the fluid duct and a cooler.

5. The temperature-control device as claimed in claim 2, wherein the fluid duct and/or a further fluid duct have/has in the fluid region at least one valve which is designed to influence or suppress a flow of the temperature-control medium in the fluid duct or in the further fluid duct.

6. The temperature-control device as claimed in claim 5, wherein the at least one valve is a temperature-controlled bimetal valve.

7. The temperature-control device as claimed in claim 5, wherein the at least one valve can be controlled by the control unit, wherein the control unit is designed to open or close the valve as a function of a temperature in the accommodation region and/or in the fluid region.

8. A method for controlling the temperature of an energy source using a temperature-control device which a temperature-control unit which has at least one Peltier element which is arranged in a thermally active fashion between an accommodation region for the energy source and a fluid region,
   wherein the control unit is capable of operating in three modes, wherein:
   (a) in the first mode, the control unit feeds to the Peltier element a voltage that causes the Peltier element to transfer heat from the hotter of the accommodation region or the fluid region to the colder of the accommodation region or fluid region;
   (b) in the second mode, the control unit feeds to the Peltier element a voltage that causes the Peltier element to transfer heat from the colder of the accommodation region or fluid region to the hotter of the accommodation region or fluid region;
   (c) in the third mode, the control unit does not feed a voltage to the Peltier element during operation of the temperature-control device;
   the method comprises the following steps:
   reading in temperature values and/or temperature differences which represent a temperature in the accommodation region and in the fluid region and/or a temperature difference between the accommodation region and the fluid region; and
   applying to the Peltier element a voltage which causes the Peltier element to transfer heat from the hotter of the accommodation region or fluid region to the colder of the accommodation region or fluid region, or
   applying to the Peltier element a voltage which causes the Peltier element to transfer heat from the colder of the accommodation region or fluid region to the hotter of the accommodation region or fluid region, or
   applying to the Peltier element no voltage which causes the Peltier element to become a thermal insulator.

9. A temperature-control device for the temperature control of an energy source, comprising:
   a temperature-control unit which has at least one Peltier element which is arranged in a thermally active fashion between an accommodation region for the energy source and a fluid region; and
   a control unit for supplying voltage to the Peltier element, wherein the control unit is configured to operate in three modes, wherein:
   (a) in the first mode, the control unit feeds to the Peltier element a voltage that causes the Peltier element to transfer heat from the hotter of the accommodation region or the fluid region to the colder of the accommodation region or fluid region;
   (b) in the second mode, the control unit feeds to the Peltier element a voltage that causes the Peltier element to transfer heat from the colder of the accommodation region or fluid region to the hotter of the accommodation region or fluid region;
   (c) in the third mode, the control unit does not feed a voltage to the Peltier element during operation of the temperature-control device;
   wherein the temperature-control unit has at least one further fluid duct in the fluid region which is thermally coupled to the accommodation region, wherein there is no Peltier element arranged between the further fluid duct and the accommodation region,
   wherein the amount of power measured in watts delivered to the Peltier element to transfer heat in the first mode or in the second mode is not greater than 10% of the amount of heat transferred by the Peltier element measured in watts,
   wherein a rate of heat transfer in the first mode or in the second mode more than doubles when 1 watt of power is delivered to the Peltier element as compared to when 0 watts of power are delivered to the Peltier element.

10. The temperature-control device as claimed in claim 1, further comprising an energy source which is thermally coupled to the Peltier element, wherein the energy source is arranged in the accommodation region.

11. The temperature-control device as claimed in claim 9, further comprising an energy source which is thermally coupled to the Peltier element, wherein the energy source is arranged in the accommodation region.

12. The temperature control device as claimed in claim 1, wherein when a temperature of the accommodation region is 20° C. and a temperature of the fluid region is 30° C., the rate of heat transfer is as follows: when 0 watts of power are delivered the rate of heat transfer is 13 watts, and when 1 watt of power is delivered the rate of heat transfer is 29 watts.

13. The temperature control device as claimed in claim 9, wherein when a temperature of the accommodation region is 20° C. and a temperature of the fluid region is 30° C., the rate of heat transfer is as follows: when 0 watts of power are delivered the rate of heat transfer is 13 watts and when 1 watt of power is delivered the rate of heat transfer is 29 watts.

14. The method as claimed in claim 8,
   wherein a rate of heat transfer in the first mode or in the second mode more than doubles when 1 watt of power is delivered to the Peltier element as compared to when 0 watts of power are delivered to the Peltier element,
   wherein when a temperature of the accommodation region is 20° C. and a temperature of the fluid region is 30° C., the rate of heat transfer is as follows: when 0 watts of power are delivered the rate of heat transfer is 13 watts and when 1 watt of power is delivered the rate of heat transfer is 29 watts.

* * * * *